United States Patent [19]
Yip et al.

[11] Patent Number: 6,071,990
[45] Date of Patent: Jun. 6, 2000

[54] AMINE FUNCTIONAL SILANE MODIFIED EPOXY RESIN COMPOSITION AND WEATHERSTRIP COATINGS MADE THEREFROM

[75] Inventors: Chak-Kai Yip, North York; James Wayne Gordon; Nabil Saba, both of Toronto, all of Canada

[73] Assignee: General Electric Company, Waterford, N.Y.

[21] Appl. No.: 08/095,369

[22] Filed: Jul. 20, 1993

Related U.S. Application Data

[63] Continuation of application No. 07/823,409, Jan. 21, 1992, abandoned.

[30]     Foreign Application Priority Data

Jan. 24, 1991 [CA] Canada ................................. 2034851

[51] Int. Cl.$^7$ .................................................. C08L 63/00
[52] U.S. Cl. ........................... 523/435; 523/456; 528/18; 528/27; 528/38
[58] Field of Search ................................ 528/27, 38, 18; 523/435, 456

[56]     References Cited

U.S. PATENT DOCUMENTS

| | | | |
|---|---|---|---|
| 3,211,684 | 10/1965 | Eakins | 525/523 |
| 3,341,486 | 9/1967 | Murphy | 528/38 |
| 4,233,428 | 11/1980 | Endo | 525/507 |
| 4,252,933 | 2/1981 | Sumida | 528/33 |
| 4,311,737 | 1/1982 | Ishizaka et al. | 427/386 |
| 4,657,986 | 4/1987 | Isayama et al. | 525/407 |

FOREIGN PATENT DOCUMENTS

| | | | |
|---|---|---|---|
| 53-079929 | 7/1978 | Japan | 523/435 |

*Primary Examiner*—David W. Wu
*Attorney, Agent, or Firm*—Kenneth S. Wheelock

[57]     ABSTRACT

A composition for use in silicone coatings comprising an epoxy resin, an amine functional silane, an organometallic compound and an organic solvent. The composition is used in combination with OH-terminated diorganosiloxane coatings to form resilient films having good freeze-release properties and improved abrasion resistance over previously known coatings.

22 Claims, No Drawings

AMINE FUNCTIONAL SILANE MODIFIED EPOXY RESIN COMPOSITION AND WEATHERSTRIP COATINGS MADE THEREFROM

This is a continuation of application(s). Ser. No. 07/823,409 filed on Jan. 21, 1992 now abandoned.

The present application claims priority of Canadian patent No. 2,034,851, filed on Jan. 24, 1991.

BACKGROUND OF THE INVENTION

The present invention relates to a composition suitable for use as a curing agent and adhesion promoter in a silicone weatherstrip coating. In particular, it relates to an amine functional silane modified epoxy resin composition used in combination with a OH-terminated diorganosiloxane coating to give a weatherstrip coating having good freeze-release properties, improved abrasion resistance and good adhesion to EPDM based weatherstrip.

A wide variety of OH-terminated diorganosiloxane coatings having freeze-release properties are known and are readily available. Most of the coatings are used to treat paper and other porous substrates such that the adhesion of the coating to the substrate is primarily based on physical anchorage. On non-porous substrates such as plastics and rubber surfaces, adhesion of these coatings is poor. Furthermore, the coatings have little resistance to removal by abrasion.

Because of the aforementioned problems associated with adhering coatings containing OH-terminated diorganosiloxane to non-porous substrates, it has been necessary to apply various primers to the substrate before applying the OH-terminated diorganosiloxane coating.

U.S. Pat. No. 4,233,428 of Isao Endo, issued Nov. 11, 1980 and assigned to General Electric Company, teaches a primer composition comprising an epoxy resin, an amine functional silane, an aminoxy functional silane or siloxane, a mercapto functional silane, and an organic solvent. Such composition is used as a primer for aminoxy curing room temperature vulcanizable silicone rubbers. The overall process of adhering curable silicone rubber compositions requires two separate steps.

U.S. Pat. No. 4,311,737 of Mitsuo Ishizaka issued Jan. 19, 1982 and assigned to General Electric company, teaches a silicone release coating comprising a polysiloxane having glycydoxy or epoxycyclohexyl groups and an amine functional silane or siloxane. These compositions provide good water repellant properties and adhesion to plastics, paper and rubber.

U.S. Pat. No. 4,252,933 of Heiji Sumida, issued Feb. 24, 1981 and assigned to General Electric Company, teaches a composition comprising a hydroxy-terminated polysiloxane, a polysiloxane having epoxy functional groups, an amine functional silane or siloxane, a hydride-containing polysiloxane and a metal salt of carboxylic acid. Such compositions are suitable for use on rubber surfaces to give non-sticking, water repellant properties and good adhesion.

There is no teaching of a one step application for an amine functional silane modified epoxy resin composition in combination with a OH-terminated diorganosiloxane composition for use as a weatherstrip coating. It has been discovered that this novel weatherstrip coating has improved abrasion resistant and freeze-release properties over those of Sumida due to the addition of an amine functional silane modified epoxy resin composition.

SUMMARY OF THE INVENTION

It is an object of the present invention to provide a composition which can be cured with an OH-terminated diorganosiloxane coating and applied to a EPDM-based rubber surface to form an abrasion resistant film having good freeze-release properties.

According to one aspect of the present invention there is provided a composition for use as a curing agent and adhesion promoter in an OH-terminated polydiorganosiloxane coating comprising:

(A) an epoxy resin;
(B) an amine functional silane, wherein the number of amino groups in the amine functional silane for each epoxy group in the epoxy resin is in the range of 1:1 to 5:1;
(C) a catalytic amount of an organometallic compound and;
(D) an organic solvent.

To enhance the formation of the composition of the present invention, the epoxy resin may be in the liquid state and include two or more epoxy groups expressed by the general formula,

within each of its molecules.

Additionally, the epoxy may be selected from:
(i) the reaction product of epichlorohydrin and bisphenol compounds. Preferably a reaction product of epichlorohydrin and bisphenol A, having the following formula,

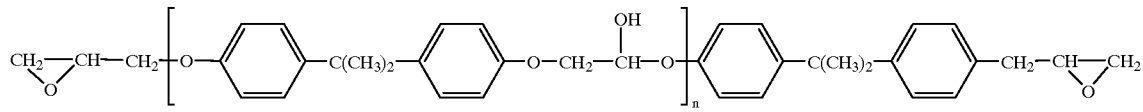

where n is in the range of 0 to 15; or (ii) a novolac type resin represented by the formula,

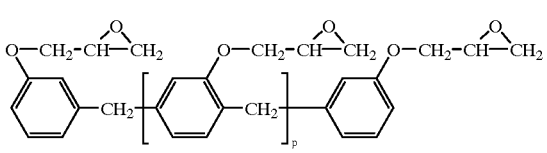

where p is in the range of 1 to 2; or (iii) a cycloaliphatic type represented by the formula,

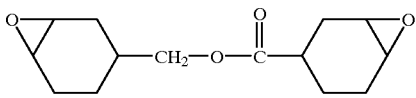

Preferably the epoxy resin may be selected from the following:

Epon (tradename of Shell) 828, 1001, 1007,
DEN (tradename of Dow) 438,
ERL (tradename of Union Carbide) 4221.

The amine functional silane (B) used in this invention is preferably an (aminoalkyl) alkoxysilane represented by the general formula:

$$R^4NHR^3Si(R^2)_b(OR^1)_{3-b}$$

wherein $R^1$ and $R^2$ are monovalent hydrocarbon groups having 1 to 4 carbons independently selected from a group comprising methyl, ethyl, propyl or butyl and b has a value of 0 or 1; $R^3$ is a divalent hydrocarbon group represented by the formula, $$(CH_2)_x$$

wherein x is a positive integer of from 3 to 10 and; $R^4$ is selected from the group comprising hydrogen, a monovalent hydrocarbon group having one to four carbons or a group represented by the formula, $$R^5NHR^3$$

wherein $R^3$ is as defined above and $R^5$ is hydrogen or a monovalent hydrocarbon group having 1 to 4 carbons. Examples of groups represented by $R^4$ comprise methyl, ethyl, propyl, butyl, aminomethyl, aminoethyl, aminopropyl, aminobutyl, ethylaminopropyl and aminoethylaminoethyl.

Examples of commonly employed amine functional silane compounds include the following:

aminopropyltriethoxysilane (AMEO),
aminopropyltrimethoxysilane (AMMO),
aminoethylaminopropyltrimethoxysilane (AEAPTMS) and,
aminoethylaminoethylaminopropyltrimethoxysilane (TAS).

The ratio of the number of amino functional groups in the amine functional silane (B) to the number of epoxy groups in the epoxy resin (A) lies in the range of 1:1 to 5:1 and preferably is in the range of 1:1 to 3:1. If the relative amount of amine functional silane to the epoxy resin is above the range, the abrasion resistance properties tend to diminish. If the relative amount of amine functional silane to epoxy resin is below the range, the mixture tends to gel.

The organometallic compound (C) serves as a condensation catalyst when the composition of the invention is admixed with OH-terminated diorganosiloxane coatings. This catalyst can be added in an amount ranging from 5 to 15 parts per 100 parts by weight based on the combined weight of (A) and (B). The metal portion of this compound can vary from manganese to lead in the Periodic Table. Organo tin compounds are preferred for use as catalysts in this type of reaction because of their speed and effectiveness at room temperature. Preferred organo tin catalysts comprise dibutyl tin oxide and tin octoate.

The organic solvent (D) used in this invention may be one or more of; (i) an aromatic hydrocarbon such as toluene, (ii) a ketone such as methylethyl ketone, (iii) an alcohol such as isopropyl alcohol (IPA), (iv) aliphatic hydrocarbons, and (v) ester type solvents. Such organic solvents provide appropriate viscosity and stability of the composition during synthesis. Although the amount of solvent to be used may vary, preferably, it should be in the range of 200 to 500 parts by weight per 100 parts of the combined weight of (A) and (B).

The composition of the present invention can be added to coatings which include OH-terminated diorganosiloxane such as those provided by the General Electric Company under composition or coating designations 6845-3A, 4A, 5A or 6A. The composition is to be blended with the appropriate quantity of the coating and diluted with an organic solvent to form a bath composition.

To prepare the coating for use, the OH-terminated diorganosiloxane coating is blended with an organic solvent in a ratio of 1:3.5 to 1:8 by weight at slow speed agitation until completely dispersed. The actual weight ratio will depend on the OH-terminated diorganosiloxane coating used. The amine functional silane modified epoxy resin composition is then added slowly and blended. The adhesion promoter is 5% to 30% by weight of the final weight of the complete coating mixture. The organic solvents used are preferably 1,1,1-trichloroethane and/or toluene.

Optimum performance of coatings based on the present invention necessitates application to clean, dry substrate. The curing of coatings based on this invention is dependent on time and temperature. The prepared coating system will cure at room temperature in approximately 24 hours. Alternatively, the cure can be accelerated to 3 minutes by using temperatures of 100 to 150° C.

The present invention is further illustrated by the following examples in which all parts are by weight.

EXAMPLE 1

The composition is produced by dissolving 20 parts of AMEO in 70 parts of IPA at 25° C. with constant mixing, 10 parts of Epon 828 is added followed by 3 parts of dibutyl tin oxide. An exothermic reaction is observed and the reaction is terminated when the temperature ceases to rise.

The following examples are prepared in a manner similar to example 1 except for the specific component variations.

EXAMPLE 2

| | |
|---|---|
| AMEO | 22.5 parts |
| IPA | 70.0 parts |
| Epon 828 | 7.5 parts |
| Dibutyl tin oxide | 3.0 parts |

EXAMPLE 3

| | |
|---|---|
| AMEO | 25.0 parts |
| IPA | 70.0 parts |
| Epon 828 | 5.0 parts |
| Dibutyl tin oxide | 3.0 parts |

EXAMPLE 4

| | |
|---|---|
| AMEO | 23.0 parts |
| IPA | 70.0 parts |
| ERL 4221 | 7.0 parts |
| Dibutyl tin oxide | 3.0 parts |

EXAMPLE 5

| | |
|---|---|
| AMEO | 14.0 parts |
| Toluene | 54.0 parts |
| Epon 1001 | 32.0 parts |
| (50% solution in MEK/toluene) | |
| Dibutyl tin oxide | 3.0 parts |

EXAMPLE 6

| | |
|---|---|
| AMEO | 5.0 parts |
| Toluene | 45.0 parts |
| Epon 1007 | 50.0 parts |
| (50% solution in MEK/toluene) | |
| Dibutyl tin oxide | 3.0 parts |

EXAMPLE 7

| | |
|---|---|
| AMEO | 22.0 parts |
| Toluene | 62.0 parts |
| DEN 438 | 16.0 parts |
| (50% solution in MEK) | |
| Dibutyl tin oxide | 3.0 parts |

EXAMPLE 8

| | |
|---|---|
| TAS | 26.0 parts |
| IPA | 70.0 parts |
| Epon 828 | 10.0 parts |
| Dibutyl tin oxide | 3.0 parts |

EXAMPLE 9

| | |
|---|---|
| AMMO | 16.0 parts |
| IPA | 61.0 parts |
| Epon 828 | 10.0 parts |
| Dibutyl tin oxide | 3.0 parts |

EXAMPLE 10

| | |
|---|---|
| AEAPTMS | 20.0 parts |
| IPA | 70.0 parts |
| Epon 828 | 10.0 parts |
| Dibutyl tin oxide | 3.0 parts |

EXAMPLE 11

| | |
|---|---|
| AMEO | 20.0 parts |
| IPA | 70.0 parts |
| Epon 828 | 10.0 parts |
| Dibutyl tin dilaurate | 3.0 parts |

EXAMPLE 12

| | |
|---|---|
| AMEO | 20.0 parts |
| IPA | 70.0 parts |
| Epon 828 | 10.0 parts |
| Dibutyl tin diacetate | 3.0 parts |

EXAMPLE 13

| | |
|---|---|
| AMEO | 20.0 parts |
| IPA | 70.0 parts |
| Epon 828 | 10.0 parts |
| Tin octoate (28%) | 5.0 parts |

EXAMPLE 14

| | |
|---|---|
| AMEO | 20.0 parts |
| IPA | 70.0 parts |
| Epon 828 | 10.0 parts |
| Zinc octoate (8%) | 7.5 parts |

For comparative purposes a standard silicone coating based on OH-terminated diorganosiloxane is prepared by blending 29.0 parts by weight of a α, -dihydroxy di-methylsiloxane of viscosity 20,000 cps, 1.0 parts of methylhydrogenpolysiloxane of viscosity lower than 100 cps and 70.0 parts by weight of toluene. The silicone coating is cured with the addition of dibutyl tin oxide in the range of 1 to 3 parts, at 100° C. for 3 minutes (sample K). The resistance to removal by abrasion of sample K is compared with the other samples prepared by adding the composition of Examples 1 to 10 to sample K.

The typical bath consists of 100 parts of sample K, 400 parts of solvent, specifically 1,1,1-trichloroethane, and 100 parts of the corresponding compositions of Examples 1 through 14. A bath based on a typical composition as is taught by Sumida in U.S. Pat. No. 4,252,933 is also prepared (sample S). The prepared coatings are spray-applied onto a 60 Durometer EPDM rubber sheet of 3 mm thickness and allowed to cure at 100° C. for 3 minutes. The thickness of the coatings is controlled to be within the range of 0.15 to 0.20 mil.

An A.A.T.C.C. model CM-5 crockmeter of Atlas Electronic Devices Company is used as a means of evaluating the resistance of the coatings to removal by abrasion. The abrasion medium is modified and is a 12.5 mm round-bottom glass finger. The finger rests on the coated EPDM sample with a pressure of 900 g and inscribes a straight path 10 cm long. This unit is equipped with an electric motor operating at the specified 60 revolutions per minute and an automatic shutdown counter. The number of cycles at which the first appearance of destruction of the rubber surface is recorded and is used as a measure of resistance to the removal by abrasion.

The results are summarized in Table 1, where the sample numbers correspond to the Example numbers.

TABLE 1

| sample | 1 | 2 | 3 | 4 | 5 | 6 | 7 | 8 | 9 | 10 | 11 | 12 | 13 | 14 | S | K |
|---|---|---|---|---|---|---|---|---|---|---|---|---|---|---|---|---|
| cycle | >5000 | 200 | 150 | 800 | 1200 | 700 | 2200 | 600 | 600 | 600 | 1000 | 200 | 4000 | 4000 | 1200 | 10 |

The results show the significant improvement the amine functional silane modified epoxy resin compositions of the invention impart to the abrasion resistance of OH-terminated diorganosiloxane coating.

The freeze-release properties imparted by the application of such coating compositions is also examined. A column of ice is formed on the coated EPDM rubber sheets through the use of an inverted Teflon cup of diameter 0.635" (e.g. Teflon stoppers, joint neck size 24/40, full length hollow, Fisher Scientific) in a freezer at −20° C. overnight. The rubber sheet is premounted on a jig assembly that is to be attached to an Instron Tensiometer for adhesion measurements.

The freeze-release values are summarized in Table 2. The sample numbers correspond to the numbers of the examples. The freeze-release of uncoated EPDM rubber is also shown as a comparison. The failure mode on uncoated rubber is partially adhesive, with partial cohesive failure of the ice column.

TABLE 2

| sample | 1 | 2 | 3 | 4 | 5 | 6 | 7 | 8 | 9 | 10 | 11 | 12 | 13 | 14 | S | uncoated |
|---|---|---|---|---|---|---|---|---|---|---|---|---|---|---|---|---|
| force (psi) | 29.7 | 38.2 | 43.3 | 38.8 | 36.6 | 34.7 | 37.9 | 48.9 | 25.3 | 33.2 | 26.8 | 31.3 | 41.0 | 37.9 | 47.4 | 94.7 |

The results show the significant improvement in freeze-release properties due to the use of coating compositions based on the invention.

What I claim as new and desire to secure by Letters Patent of the United States of America is:

1. A composition consisting essentially of (A) an epoxy resin selected from the group consisting of
   (i) a product of the reaction of epichlorohydrin and bisphenol which product has the formula,

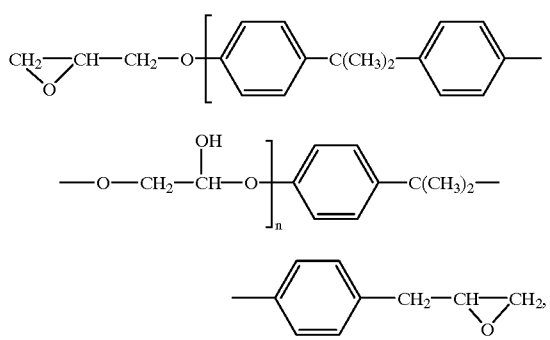

wherein n is a number in the range of 0 to 15;

(ii) a novolac resin which resin has the formula,

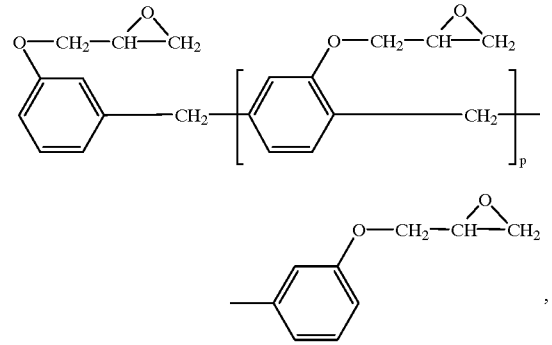

wherein p is a number in the range of 1 to 2; and (iii) a cycloaliphatic compound which compound has the formula,

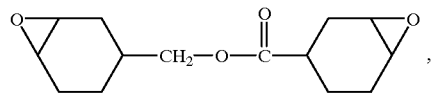

(B) an amine functional silane of the formula,

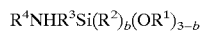

$R^4NHR^3Si(R^2)_b(OR^1)_{3-b}$ wherein $R^1$ and $R^2$ are monovalent hydrocarbon groups of 1 to 4 carbons and b has a value of 0 or 1; $R^3$ is a divalent hydrocarbon group of the formula,

$(CH_2)_x$ wherein x is a positive integer of from 3 to 10; and $R^4$ is selected from the group consisting of hydrogen, a monovalent hydrocarbon group of one to four carbons and a group of the formula,

$R^5NHR^3$ wherein $R^3$ is as defined above and $R^5$ is hydrogen or a monovalent hydrocarbon group of 1 to 4 carbons
wherein the ratio of the number of amino groups in the amine functional silane to the number of the epoxy groups in the epoxy resin is in the range of 1:1 to 5:1;

(C) a catalytic amount of an organometallic compound; and (D) an organic solvent which composition, when added to an OH-terminated polydiorganosiloxane, then applied to an EPDM-base rubber surface and cured thereon, forms an abrasion resistant film adherent to the surface and having good freeze-release properties.

2. The composition of claim 1 wherein the ratio of the number of amino functional groups in (b) to the number of epoxy functional groups in (a) is in the range of 1:1 to 3:1.

3. The composition of claim 1 wherein the amine functional silane is aminopropyltriethoxysilane.

4. The composition of claim 1 wherein the amine functional silane is aminopropyltrimethoxysilane.

5. The composition of claim 1 wherein the amine functional silane is aminoethylaminopropyltrimethoxysilane.

6. The composition of claim 1 wherein the amine functional silane is aminoethylaminoethylaminopropyltrimethoxysilane.

7. The composition of claim 1 wherein the epoxy resin is a liquid and contains two or more groups of the general formula:

in each molecule.

8. The composition of claim 7 wherein the epoxy resin is the reaction product of epichlorohydrin and a bisphenol compound.

9. The composition of claim 7 wherein the epoxy is a novolac resin.

10. The composition of claim 7 wherein the epoxy is a cycloaliphatic resin.

11. The composition of claim 1 wherein the organometallic compound is 5 to 15 parts by weight per 100 parts of (a) and (b) combined.

12. The composition of claim 1 wherein the metal portion of the organometallic compound is a metal having an atomic number between that of manganese and lead.

13. The composition of claim 1 wherein the organometallic compound has a metal portion of tin.

14. The composition of claim 1 wherein the amount of organic solvent is in the range of 200 to 500 parts by weight per 100 parts of the combined weight of (a) and (b).

15. A weatherstrip coating comprising an OH-terminated polydiorganosiloxane and the composition of claim 1.

16. The weatherstrip coating of claim 15 applied to structures formed from EPDM rubber.

17. The composition of claim 1 applied to structures formed from EPDM rubber.

18. A composition for use as a curing agent and adhesion promoter in a OH-terminated polydiorganosiloxane coating, said composition comprising:
  (a) liquid epoxy resin comprising the reaction product of epichlorohydrin and bisphenol A;
  (b) aminopropyltriethoxysilane, wherein the ratio of the number of amino groups in (b) to the number of epoxy groups in (a) is in the range of 1:1 to 3:1;
  (c) dibutyl tin oxide comprising 5 to 15 parts by weight per 100 parts by weight of (a) and (b) combined and;
  (d) isopropyl alcohol comprising 200 to 500 parts by weight per 100 parts by weight of (a) and (b) combined.

19. A weatherstrip coating comprising an OH-terminated polydiorganosiloxane and the composition of claim 18.

20. The composition of claim 18 applied to structures formed from EPDM rubber.

21. The weatherstrip coating of claim 19 applied to structures formed from EPDM rubber.

22. A method for increasing the freeze-release properties of an EPDM-base rubber weather stripping which consists essentially of
  (I) preparing a composition comprising
    (A) an epoxy resin selected from the group consisting of
      (i) a product of the reaction of epichlorohydrin and bisphenol which product has the formula,

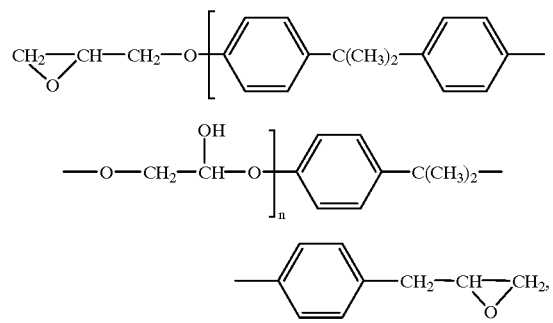

wherein n is a number in the range of 0 to 15;
    (ii) a novolac resin which resin has the formula,

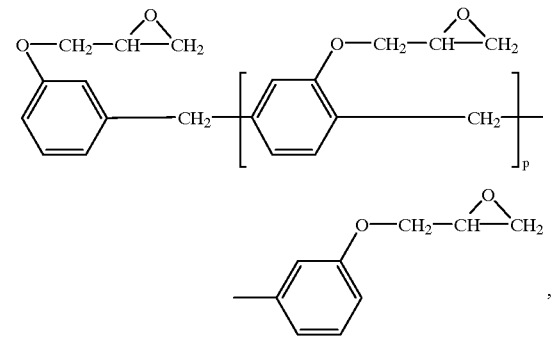

wherein p is a number in the range of 1 to 2: and
    (iii) a cycloaliphatic compound which compound has the formula,

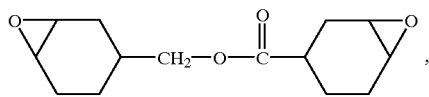

(B) an amine functional silane of the formula, $$R^4NHR^3Si(R^2)_b(OR^1)_{3-b}$$

wherein R1 and R2 are monovalent hydrocarbon groups of 1 to 4 carbons and b has a value of 0 or 1; $R^3$ is a divalent hydrocarbon group of the formula, $$(CH_2)_x$$

wherein x is a positive integer of from 3 to 10; and $R^4$ is selected from the group consisting of hydrogen, a monovalent hydrocarbon group of one to four carbons and a group of formula, $$R^5NHR^3$$

wherein $R^3$ is as defined above and $R^5$ is hydrogen or a monovalent hydrocarbon group of 1 to 4 carbons
wherein the ratio of the number of amino groups in the amine functional silane to the number of the epoxy groups in the epoxy resin is in the range of 1:1 to 5:1;

(C) a catalytic amount of an organometallic compound; and (D) an organic solvent;

(II) adding the composition to an OH-terminated polydiorganosiloxane to form a curable composition;

(III) applying the curable composition to the EPDM-base rubber weather stripping; and (IV) curing the curable composition to form an adherent coating with good freeze-release properties on the surface of the EPDM-base weather stripping.

* * * * *